(12) United States Patent
Wanner et al.

(10) Patent No.: US 10,807,719 B2
(45) Date of Patent: Oct. 20, 2020

(54) MULTI-POSITION ADJUSTABLE HEADREST ASSEMBLY

(71) Applicant: B/E Aerospace, Inc., Winston-Salem, NC (US)

(72) Inventors: Jackson R. Wanner, Winston-Salem, NC (US); Matthew T. Greninger, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/279,028

(22) Filed: Feb. 19, 2019

(65) Prior Publication Data
US 2020/0262565 A1 Aug. 20, 2020

(51) Int. Cl.
| | |
|---|---|
| *B64D 11/06* | (2006.01) |
| *B60N 2/865* | (2018.01) |
| *B60N 2/809* | (2018.01) |
| *B60N 2/885* | (2018.01) |
| *B60N 2/838* | (2018.01) |

(52) U.S. Cl.
CPC .......... *B64D 11/0642* (2014.12); *B60N 2/809* (2018.02); *B60N 2/838* (2018.02); *B60N 2/865* (2018.02); *B60N 2/885* (2018.02)

(58) Field of Classification Search
CPC .... B64D 11/0642; B60N 2/809; B60N 2/838; B60N 2/885; B60N 2/865
See application file for complete search history.

(56) References Cited

U.S. PATENT DOCUMENTS

| | | | |
|---|---|---|---|
| 5,020,855 A * | 6/1991 | Lindberg | B60N 2/838 |
| | | | 297/391 |
| 6,467,846 B2 | 10/2002 | Clough | |
| 7,131,698 B2 | 11/2006 | Dowty et al. | |
| 7,681,954 B2 | 3/2010 | Barrou | |
| 7,744,158 B2 | 6/2010 | Schürg | |
| 7,992,933 B2 * | 8/2011 | Yetukuri | B60N 2/4228 |
| | | | 297/216.12 |
| 8,657,378 B2 * | 2/2014 | Kunert | B60N 2/815 |
| | | | 297/391 |
| 8,696,065 B2 | 4/2014 | Udriste et al. | |
| 8,899,685 B2 * | 12/2014 | Haeske | B60N 2/809 |
| | | | 297/410 |
| 9,611,041 B2 * | 4/2017 | Baker | B64D 11/0642 |
| 10,336,230 B2 * | 7/2019 | Novin | B60N 2/809 |
| 10,414,312 B2 * | 9/2019 | Fredriksson | B60N 2/865 |
| 2017/0152049 A1 | 6/2017 | Iossifidis et al. | |
| 2017/0368970 A1 | 12/2017 | Lessard | |

* cited by examiner

*Primary Examiner* — Philip F Gabler
(74) *Attorney, Agent, or Firm* — Suiter Swantz pc llo

(57) ABSTRACT

An adjustable headrest assembly attachable to a seat back and including a linear slide and rotating links that allow the headrest to translate forward, laterally and/or about axes parallel to the seat back to provide head support in various positions. The headrest may further include lateral parts independently adjustable in angle relative to a center part to provide enhanced lateral head support. The adjustable headrest assembly is attachable to a front side of a seat back or to other adjustment mechanisms such as a vertical adjustment mechanism for moving the headrest assembly up or down relative to a seat back.

20 Claims, 12 Drawing Sheets

MULTI-POSITION ADJUSTABLE HEADREST ASSEMBLY

BACKGROUND

Vehicle seats such as aircraft passenger seats are commonly equipped with headrests. Headrest constructions may be simple or complex. Simple constructions may include fixed headrests in the form of cushion elements integrated into the seat back dress cover. Complex constructions may include cushion elements applied over rigid support structures. Complex constructions may further include mechanisms for adjusting the headrest position relative to the seat back. For example, vertical adjustment mechanisms may function to translate the headrest up or down vertically, while angular adjustment mechanisms may function to pivot the entire headrest about a horizontal axis.

While complex headrest constructions may provide a degree of adjustability, conventional headrest constructions are not able to replicate the sidewall effect of a passenger cabin such as an aircraft cabin. In main cabin seating, passengers sitting in an outboard seat will often use a personal pillow, article of clothing, etc., placed against the sidewall to make a comfortable surface to rest their head. For some passengers, it is inconvenient, undesirable or not possible to carry extra items onboard for the sole purpose of making a comfortable sitting or sleeping position. For other passengers, and particularly those sitting in inboard seats, there is no perpendicular support surface available on which to place personal articles to make a more comfortable sitting or sleeping position.

Accordingly, what is needed is a headrest construction that obviates the need for separate personal items to make more comfortable sitting or sleeping positions. A desirable headrest construction would be integrated into the seat construction and include a mechanism for positioning the headrest to support various sitting and sleeping positions including at least support for the back and sides of the head. A desirable headrest construction would be easily adjustable and robust to ensure a long lifespan without failure.

SUMMARY OF THE INVENTIVE ASPECTS

To achieve the foregoing and other advantages, the inventive aspects disclosed herein are directed to an adjustable headrest assembly for attachment to a seat back including an adapter plate assembly attachable to a front of a seat back or a seat back element, a headrest disposed forward of the adapter plate assembly, and an adjustment mechanism movably coupling the headrest to the adapter plate assembly. The adjustment mechanism includes a linear slide mounted to the headrest, first and second carriages slidable along the linear slide, and first and second connecting links, wherein the first connecting link is pivotally attached to the first carriage and to the adapter plate assembly and the second connecting link is pivotally attached to the second carriage and to the adapter plate assembly.

In some embodiments, the adjustment mechanism may allow at least one of forward translation, lateral translation, and rotational adjustment of the headrest.

In some embodiments, the first connecting link may be pivotally attached at one end to the first carriage and at an opposing end to the adapter plate assembly such that the first connecting link can rotate between a first position parallel to the adapter plate assembly and a second position at an angle to the adapter plate assembly, and wherein the second connecting link may be pivotally attached at one end to the second carriage and at an opposing end to the adapter plate assembly such that the second connecting link can rotate between a first position parallel to the adapter plate assembly and a second position at an angle to the adapter plate assembly.

In some embodiments, the first and second connecting links may rotate outward in opposite directions to drive the headrest apart from the adapter plate assembly and may rotate inward in opposite directions to drive the headrest toward the adapter plate assembly.

In some embodiments, the adjustment mechanism may allow one side of the headrest to move away from the adapter plate assembly while an opposing side of the headrest may remain generally with the adapter plate assembly.

In some embodiments, the headrest may include a center part and lateral parts pivotally attached to the center part and adjustable in angle relative to the center part.

In some embodiments, the lateral parts may be adjustable in angle relative to the center part independent of adjustment of the center part relative to the adapter plate assembly or the seat back.

In some embodiments, the adapter plate assembly may include an adapter plate and a guide mounted to the adapter plate, wherein each of the first and second connecting links are pivotally attached to the guide.

In some embodiments, the guide may be a component of a vertical adjustment mechanism movably coupling the adapter plate assembly to a fixed seat back element.

In another aspect, the inventive concepts disclosed herein are directed to an adjustable headrest assembly attachable to a seat back and including a headrest and an adjustment mechanism including a linear slide mounted to the headrest, first and second carriages slidable along the linear slide, and first and second connecting links, the first connecting link pivotally attached to the first carriage and pivotally attachable to a seat back element and the second connecting link pivotally attached to the second carriage and pivotally attachable to a seat back element.

In some embodiments, the adjustment mechanism may allow at least one of forward translation, lateral translation, and rotation of the headrest.

In some embodiments, the assembly may further include an adapter plate assembly attachable to the seat back, wherein the first connecting link may be pivotally attached at one end to the first carriage and at an opposing end to the adapter plate assembly, and wherein the second connecting link may be pivotally attached at one end to the second carriage and at an opposing end to the adapter plate assembly.

In some embodiments, the first and second connecting links may rotate outward in opposite directions to drive the headrest apart from the seat back and may rotate inward in opposite directions to drive the headrest toward the seat back.

In some embodiments, the adjustment mechanism may allow one side of the headrest to move away from the seat back while an opposing side of the headrest may remain generally with the seat back.

In some embodiments, the headrest may include a center part and lateral parts pivotally attached to the center part and adjustable in angle relative to the center part, and wherein the lateral parts are adjustable in angle relative to the center part independent of adjustment of the center part relative to the seat back.

In another aspect, the inventive concepts disclosed herein are directed to an aircraft passenger seat assembly including a seat back and an adjustable headrest assembly attachable to the seat back. The adjustable headrest assembly includes an adapter plate, a headrest disposed forward of the adapter plate, and an adjustment mechanism movably coupling the headrest to the adapter plate and including a linear slide mounted to the headrest, first and second carriages slidable along the linear slide, and first and second connecting links, the first connecting link being pivotally attached to the first carriage and to the adapter plate and the second connecting link being pivotally attached to the second carriage and to the adapter plate.

In some embodiments, the adjustment mechanism may allow at least one of forward translation, lateral translation, and rotation of the headrest relative to the seat back.

In some embodiments, the first and second connecting links may rotate outward in opposite directions to drive the headrest apart from the adapter plate and may rotate inward in opposite directions to drive the headrest toward the adapter plate.

In some embodiments, the headrest may include a center part and lateral parts pivotally attached to the center part and adjustable in angle relative to the center part, wherein the lateral parts are adjustable in angle relative to the center part independent of adjustment of the center part relative to the adapter plate.

In some embodiments, the assembly may further include a guide mounted to the adapter plate, wherein the first and second connecting links are pivotally attached to the guide, and wherein the guide is a component of a vertical adjustment mechanism for moving the adjustable headrest assembly up or down relative to the seat back.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DESCRIPTION OF ILLUSTRATIVE EMBODIMENTS

Figure 1:
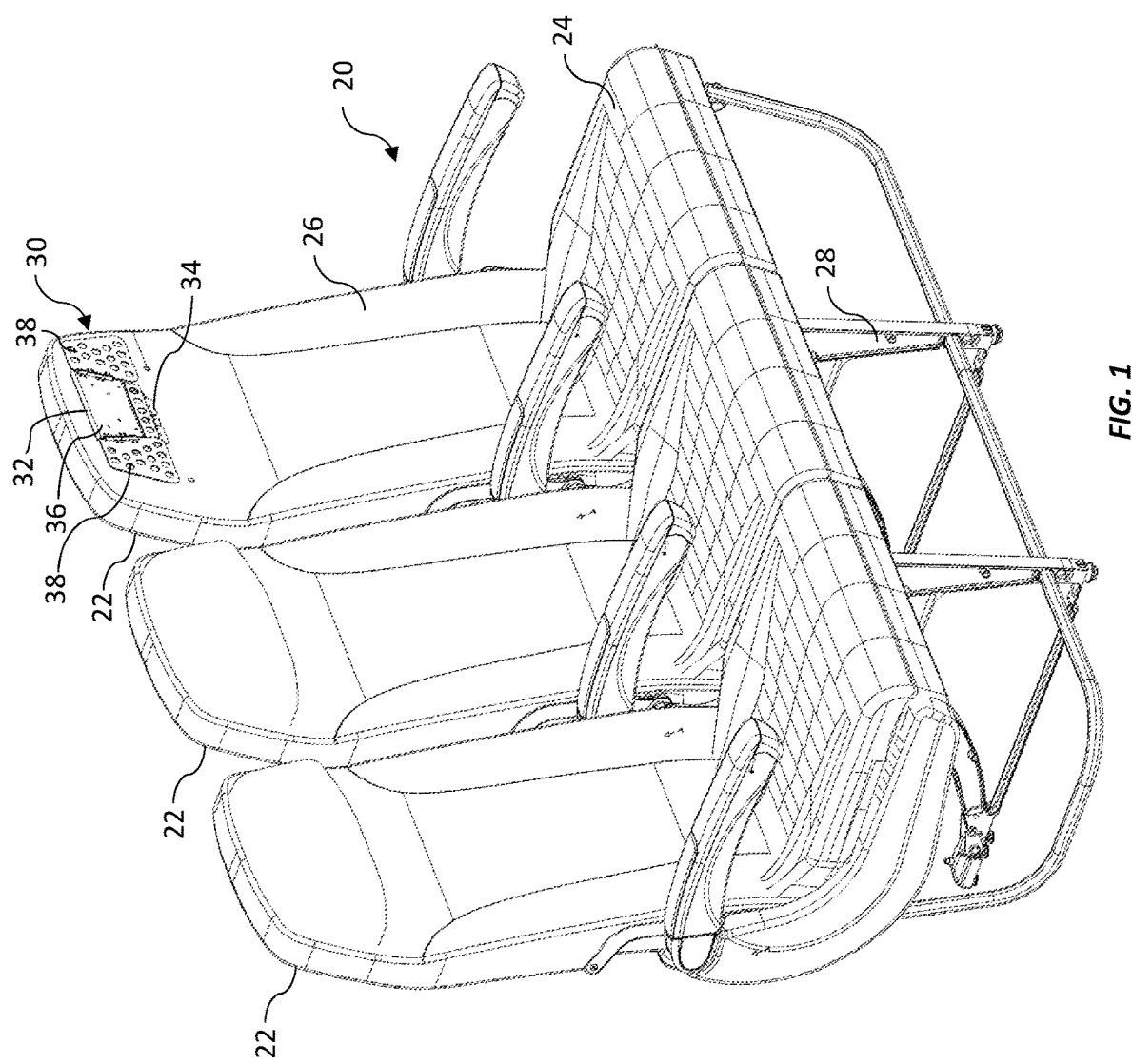
FIG. 1 is an isometric view of a passenger seating group showing a headrest assembly according to the present disclosure attached to a front of one of the seat backs.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

With reference to the drawing figures, disclosed herein are inventive aspects of a headrest assembly attachable to and adapted for use with any seat construction such as an aircraft passenger seat construction. The headrest assembly may be attachable to a seat back or a seat back element, either directly or indirectly. For example, attachment may include direct attachment to the front of the seat back, direct attachment to a seat back frame element, indirect attachment to the seat back through a plate, indirect attachment to another element through an adjustment mechanism such as a vertical adjustment mechanism or a pivot adjustment mechanism, etc. The headrest assembly is attachable to the front side of the seat back and is positioned in relation to the seat back to support the head and/or neck of a seat occupant in various sitting and sleeping positions. The headrest assembly includes a primary or integrated adjustment mechanism for changing a position of at least one headrest part relative to the seat back, and is compatible for use with at least one secondary adjustment mechanism, for example, an adjustment mechanism for changing the vertical position of the headrest relative to a seat back or a pivot mechanism for tilting the headrest up or down about a horizontal axis.

In one aspect, the integrated adjustment mechanism functions to translate the headrest fore or aft, laterally to one side or the other, or rotate the headrest relative to the seat back by translating one side of the headrest fore or aft. The adjustment mechanism functions to transition the headrest between various positions depending on the needs and desires of the seat occupant. For example, the headrest may be positioned in a first position corresponding to a stowed position in which the headrest is nearest the seat back and parallel to a seat back lateral axis. The headrest may be positioned in a second position corresponding to a first deployed position in which the headrest is farthest from the seat back and remains parallel to the seat back lateral axis. The headrest may be moved from the first position to the second position by pulling and returned to the first position by pushing the headrest toward the seat back. Movement may also be automated, for example, by driving rotation of the connecting links.

The headrest may be positioned in a third position corresponding to a second deployed position in which the headrest is tilted to the right (e.g., rotated about a vertical axis) to position the headrest at an angle to the seat back lateral axis to provide lateral support to the left side of the head. In the third position one side of the headrest is nearest the seat back while the opposing side of the headrest is farthest from the seat back. The headrest may also be positioned in a fourth position corresponding to a third deployed position in which the headrest is tilted to the left (e.g., rotated about a vertical axis) to position the headrest at an angle to the seat back lateral axis to provide lateral support to the right side of the head. In the fourth position one side of the headrest is nearest the seat back while the opposing side of the headrest is farthest from the seat back. The headrest may be positioned in other positions such as intermediate positions between any of the foregoing positions. The headrest may be selectively movable from any one position to any other position without having to follow any specific repositioning sequence.

The headrest is mounted to or upon an adjustment mechanism that allows the headrest to translate and/or rotate. The headrest assembly generally includes a linear slide mounted to a back of the headrest and a pair of attached linkages mounted to carriages engaging the linear slide. The linkages may be pivotally attached to an adapter plate coupled to the seat back or other seat back element. In an optional embodiment, the adapter plate may be coupled with a mounting plate to provide vertical adjustment of the headrest. The linkages are free to pivot on the headrest side and seat back side, and operate independently of one another to allow the headrest to rotate or tilt about a vertical axis.

In use, in a fully stowed position the linkages are rotated inward to parallel or near parallel with the seat back such that the linkages are colinear and point toward each other. The mounts on the rail may be near the center of the seat back and may be close to touching when the headrest is fully stowed. As the headrest is pulled or otherwise translated forward away from the seat back, the linkages rotate in opposite directions outward and move away from each other. The carriages engaged in the linear rail also move outward and apart from each other toward their respective end the rail. The length of the linkages and or rotational stops associated with the linkages may be used to adjust/determine the maximum distance limit of the headrest from the seat back when fully deployed.

For lateral support, the headrest can be rotated such that one linkage collapses back against the seat back while the other linkage is deployed and extended. For maximum lateral support, a wing pivotally attached to one end of the headrest may be angled forward out of the plane of a center part of the headrest to provide additional lateral support. In extreme lateral deployment, the headrest may be rotated and the wing angled fully such that the wing is positioned generally perpendicular to the seat back lateral axis. The degrees of freedom of the headrest and optional side wings can be combined to offset the headrest to one side or the other and rotate the headrest out and away from the seat back to provide a headrest support surface for enhance lateral head support.

Referring to FIG. 1, a non-limiting example of a passenger seating group is shown generally at reference numeral 20. The passenger seating group 20 may be an economy class, premium economy class, or other class of seating group. The headrest assembly embodiments of the present disclosure are compatible for use with any seat construction that can benefit from an adjustable headrest. As shown, the passenger seating group 20 includes three laterally-adjacent seats 22 each having a seat bottom 24 and a seat back 26 supported on or by a seat base frame 28. The seat base frame 28 may include shared frame members such as legs, spreaders and transverse beams. Each seat back 26 may recline during flight to enhance comfort.

Each seat 22 in the passenger seating group 20 is preferably equipped with a headrest assembly 30 according to an embodiment of the present disclosure. The headrest assembly 30 generally includes a headrest 32 disposed forward of an adapter plate 34 attachable to the seat back, either directly or indirectly. The headrest 32 generally includes a center part 36 and may optionally include pivotally attached and angularly-adjustable side or lateral parts 38, for example, in the form of wings. Each of the center part 36 and the lateral parts 38 may be rigid support plates having weight-saving holes. Cushion elements may be applied over the rigid center part 36 and optional lateral parts 38 to enhance comfort. Upholstery may be applied over the cushion elements to further enhance comfort and give the headrest a finished look. The center part 36 and optional lateral parts 38 may be upholstered separately to allow angular adjustment between the parts.

Figure 2:
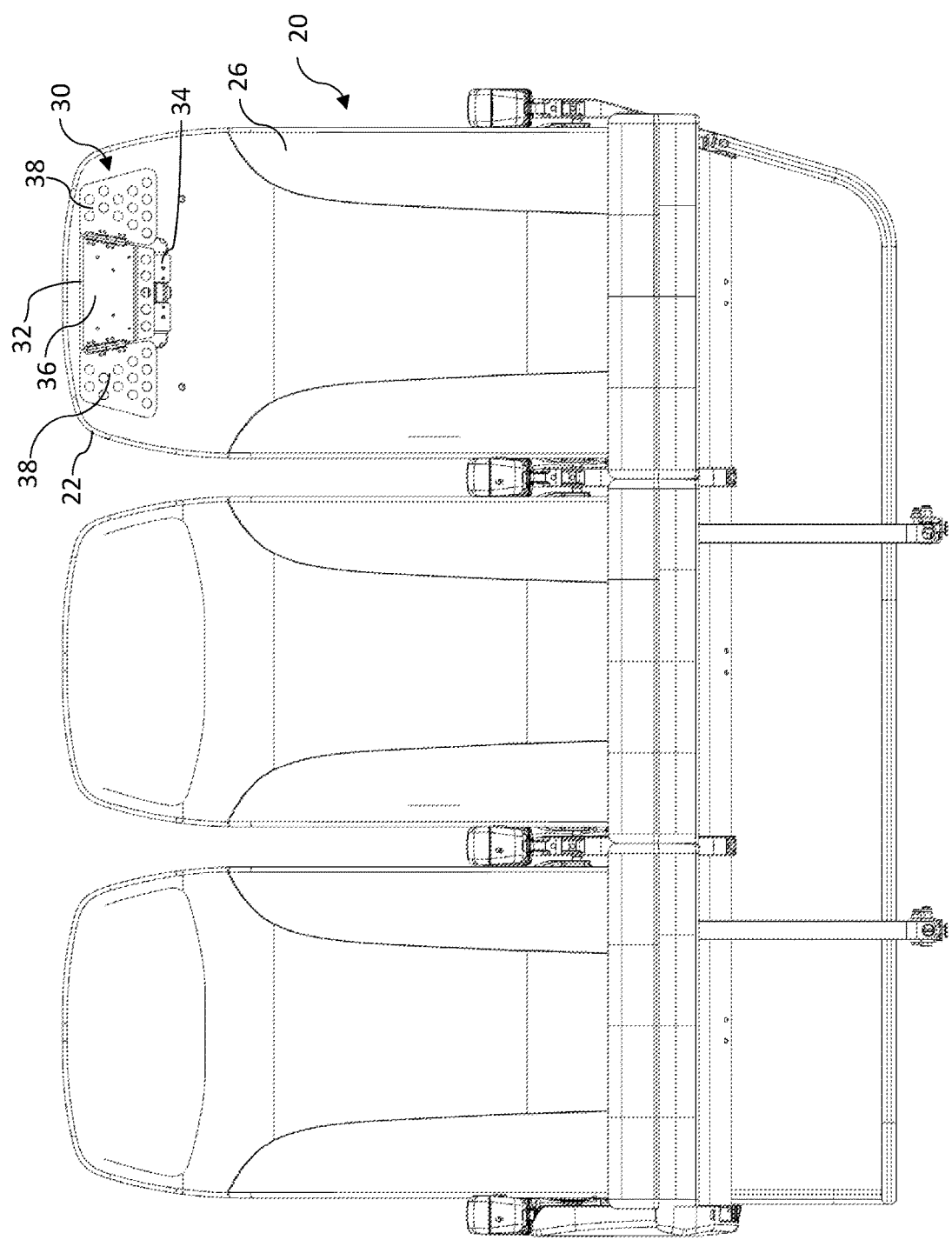
FIG. 2 is a front view of the passenger seating group shown in FIG. 1 showing the headrest stowed.

FIG. 2 shows the passenger seating group 20 from the front and with the headrest 32 in a fully stowed position against the seat back 26 and with the center part 36 and lateral parts 38 residing in the same plane. From this position, the headrest 32 can be pulled forward with or without adjusting the angle of the lateral parts 38 relative to the center part 36. Alternatively, one or more of the lateral parts 38 can be moved out of the plane of the center part 36 without adjusting the position of the center part relative to the seat back 26. For example, the headrest may be moved forward without changing the lateral part angles to position the headrest father from the seat back without enhancing lateral head support, or lateral support may be enhanced without adjusting the position of the center part.

Figure 3:
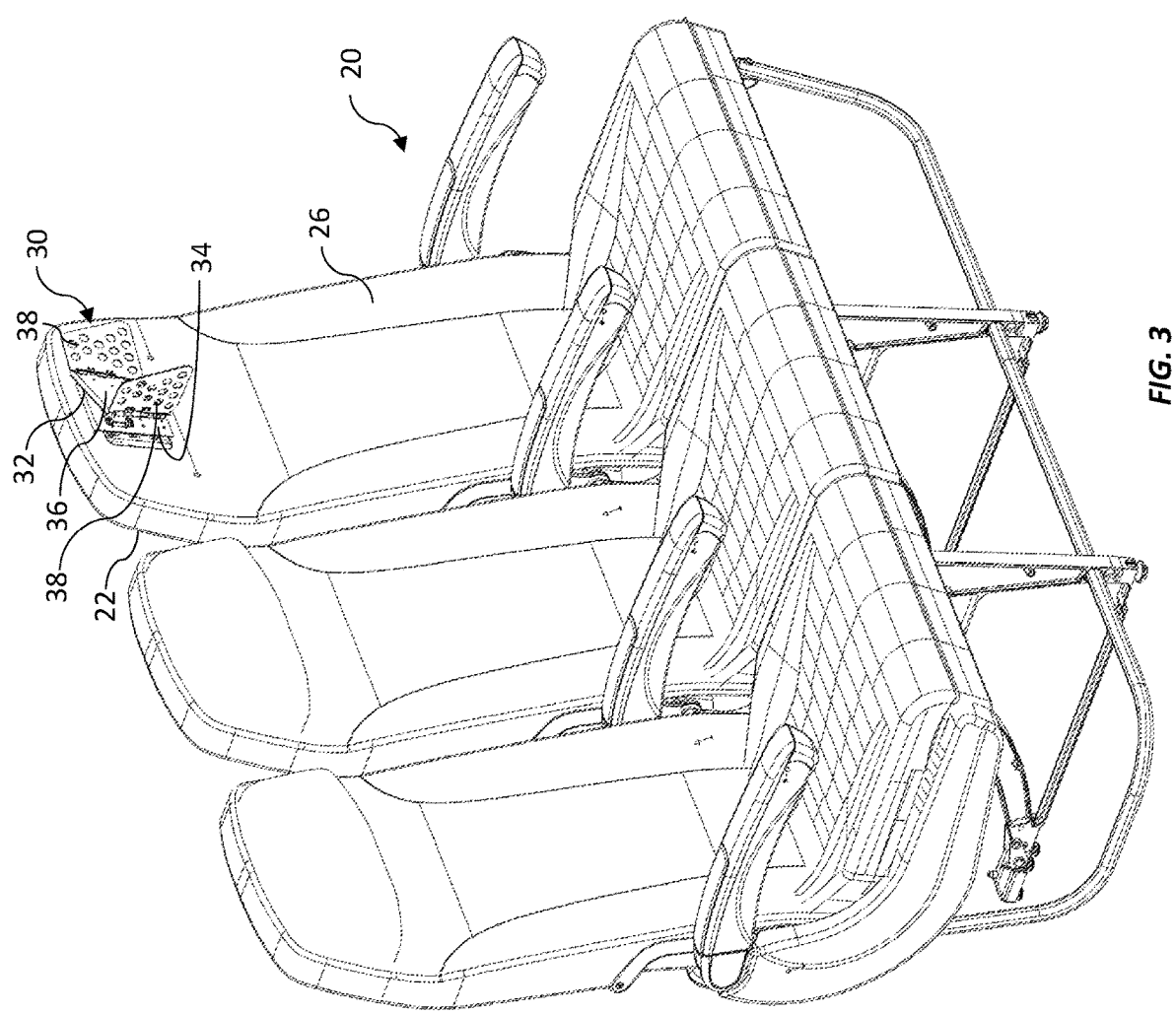
FIG. 3 is an isometric view of the passenger seating group shown in FIG. 1 showing the headrest translated laterally to be positioned at an angle to the seat back.
Figure 4:
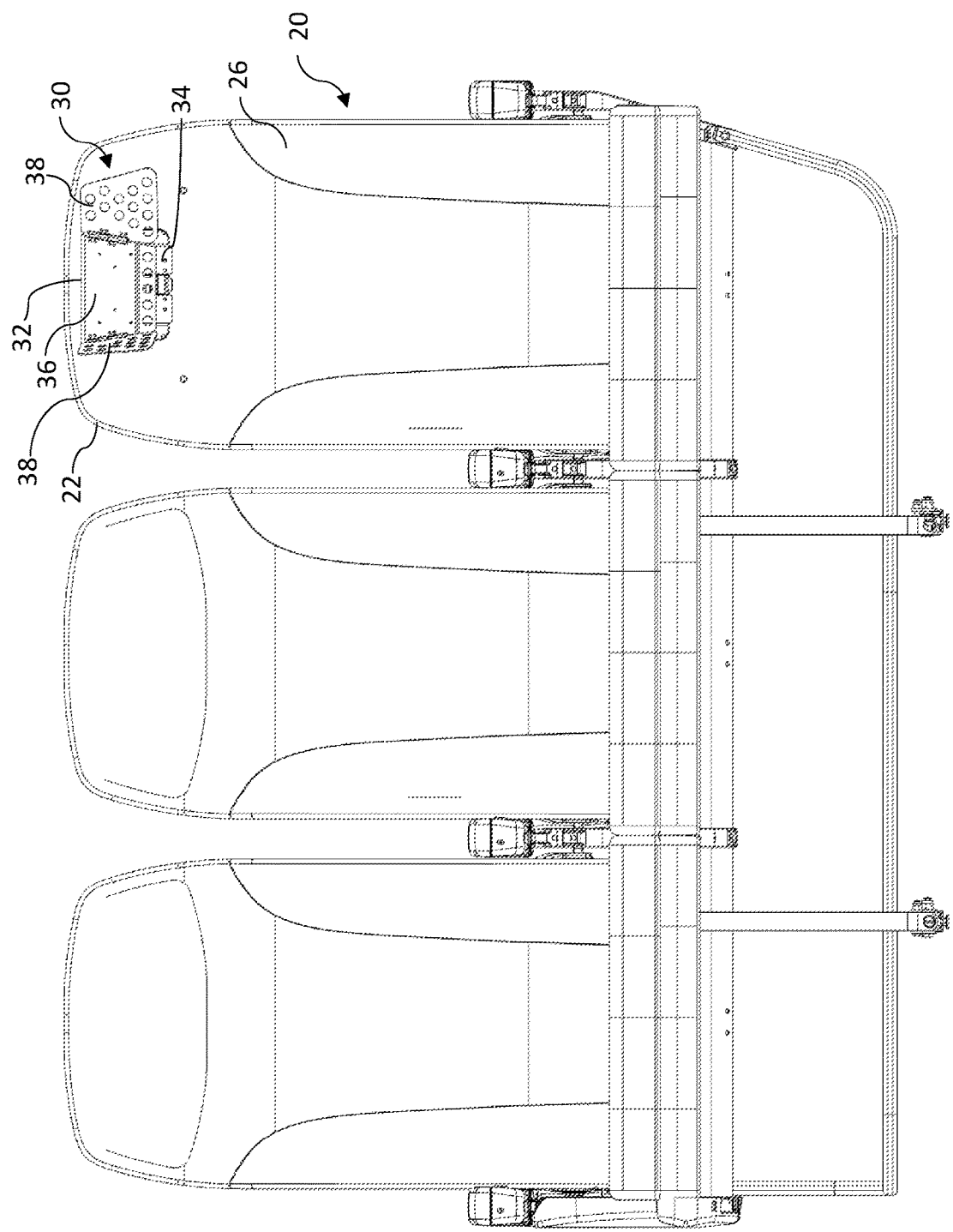
FIG. 4 is a front view of the passenger seating group shown in FIG. 1 showing the headrest translated laterally to be positioned at an angle to the seat back.

FIGS. 3 and 4 show the headrest assembly 30 with the headrest 32 rotated to the left to position the headrest at an angle to the seat back lateral axis. The headrest 32 is shown tilted to the left to provide lateral support to the right side of the head. The left-side lateral part 38 is angled relative to the center part 36 to remain parallel to the seat back lateral axis. The right-side lateral part 38 is angled forward relative to the center part 36 to reside generally perpendicular to the seat back lateral axis to provide maximum lateral support.

Figure 5:
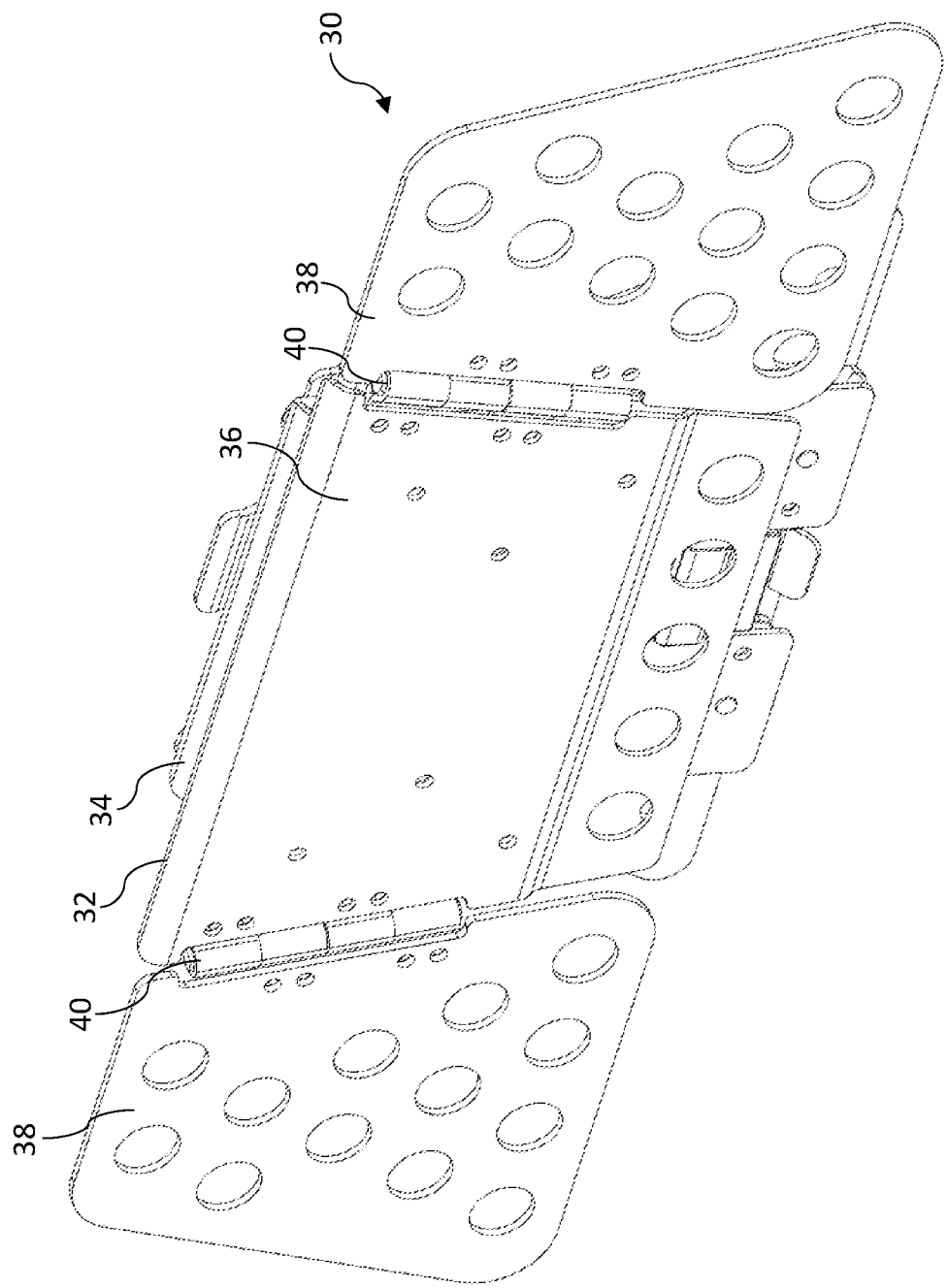
FIG. 5 is an isometric view of the headrest assembly showing the headrest stowed.

FIG. 5 shows the headrest assembly 30 generally including the headrest 32 movably coupled to the adapter plate 34. The headrest 32 is shown including the center part 36 and optional lateral parts 38. Torque hinges 40 may be used to pivotally attach each of the left-side and right-side lateral parts 38 to the center part 36 to provide continual resistance throughout the entire range of motion of the lateral parts while making it possible to position and retain the position of the lateral parts independently relative to the center part. Other hinge types and mechanisms able to hold their position throughout their full range of motion may be used. The lateral parts 38 may taper toward their top while the center part 36 may have a complimentary taper toward the bottom, or vice versa. In the fully stowed position, at least the center part 36 may be parallel to the adapter plate 34. The center part 36 and lateral parts 38 may be rigid metal plates having a thin profile.

Figure 6:
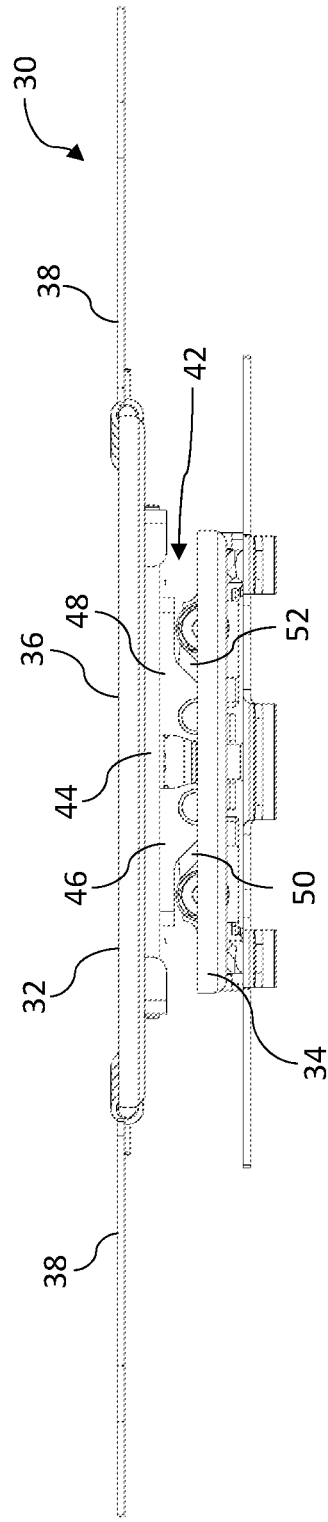
FIG. 6 is a top view of the headrest assembly shown in FIG. 5.

FIG. 6 shows a top view of the headrest assembly 30 in the fully stowed configuration. The headrest assembly 30 further includes an adjustment mechanism 42 for movably coupling the headrest 32 to the adapter plate 34, and more particularly, movably coupling the center part 36 to the adapter plate 34. The adjustment mechanism 42 generally includes a linear slide 44, first and second carriages 46, 48 slidable along the linear slide, and first and second connecting links 50, 52. The linear slide 44 is horizontally mounted to the back of the headrest 32. The first and second carriages 46, 48 are engaged to slide along the linear slide 44. The first connecting link 50 is pivotally attached to each of the first carriage 46 and the adapter plate 34. The second connecting link 52 is pivotally attached to each of the second carriage 48 and the adapter plate 34. The linkages, including a first linkage including the first carriage 46 and the first connecting link 50 and a second linkage including the second carriage 48 and the second connecting link 52, move together to translate the headrest 32 forward or aft while maintaining parallelness with the adapter plate 34, or independently to induce an angle in the headrest 32.

The first connecting link 50 is pivotally attached at one end to the first carriage 46 and at an opposing end to the adapter plate 34 such that the first connecting link is free to pivot on both the headrest side and the seat back side to rotate between a first position parallel to the adapter plate and a second position at an angle to the adapter plate. The second connecting link 52 is pivotally attached at one end to the second carriage 48 and at an opposing end to the adapter plate 34 such that the second connecting link is free to pivot on both the headrest side and the seat back side to rotate between a first position parallel to the adapter plate and a second position at an angle to the adapter plate. As the first and second connecting links 50, 52 rotate, their respective first and second carriages 46, 48 slide along the linear rail 44. More specifically, as the first and second connecting links 50, 52 rotate inward their respective first and second carriages 50, 52 slide toward center, and as the first and second connecting links rotate outward their respective first and second carriages slide outward.

The independent movement of the linkages allows the headrest to be moved by way of translation, rotation or a combination of both. As the first and second connecting links 50, 52 rotate outward in opposite directions the headrest 32 is driven away from the adapter plate 34, and as the first and second connecting links 50, 52 rotate inward in opposite directions the headrest is driven toward the adapter plate. One connecting link can rotate more than the other to induce an angle in the headrest 32 relative to the adapter plate to provide different headrest angles and varying degrees of lateral head support.

Figure 7:
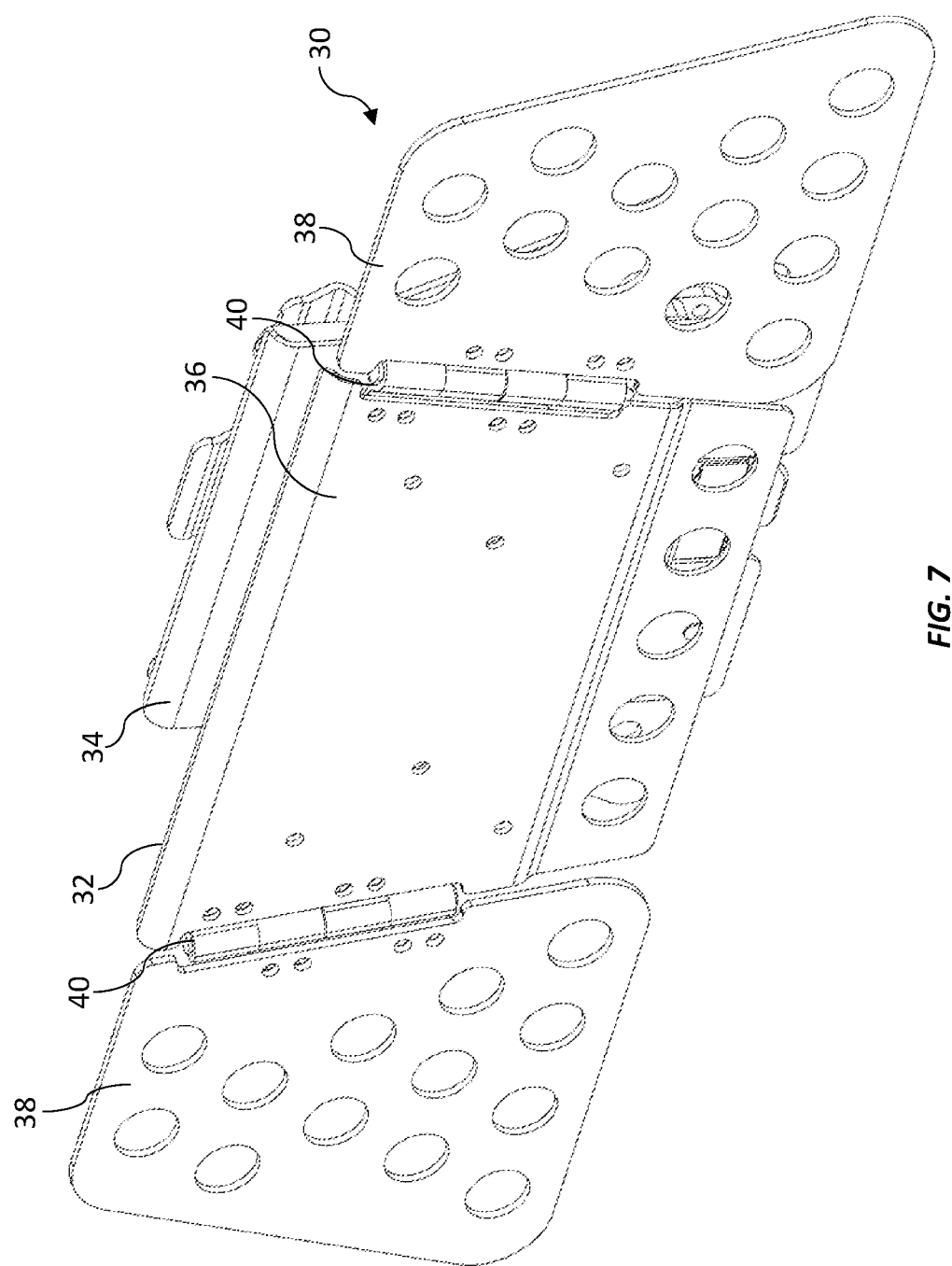
FIG. 7 is an isometric view of the headrest assembly showing the headrest translated forward.
Figure 8:
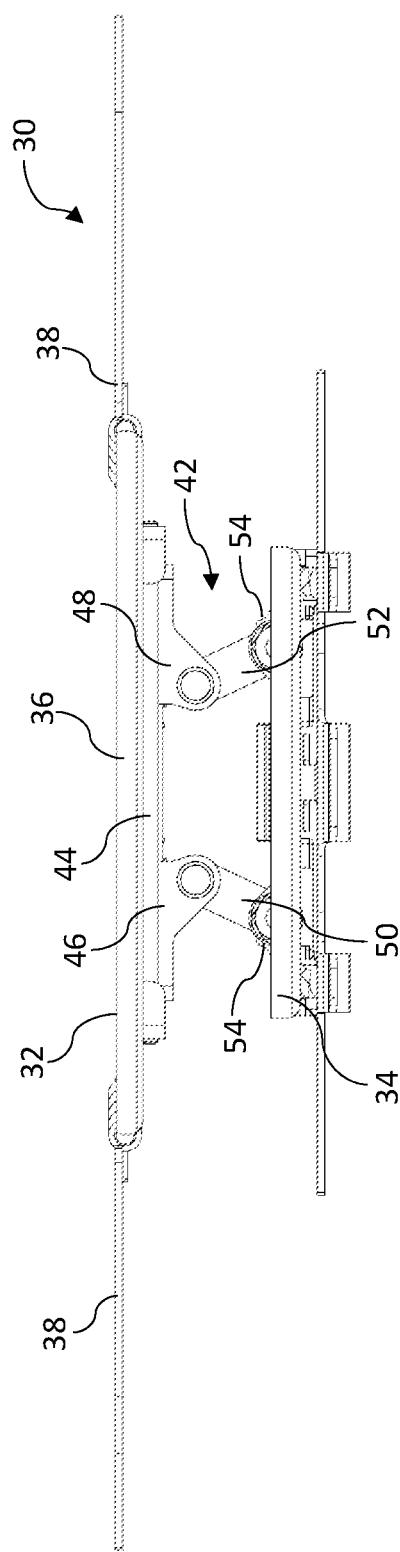
FIG. 8 is a top view of the headrest assembly shown in FIG. 7.

FIGS. 7 and 8 show the headrest assembly 30 with the headrest 32 translated fully forward to the extension limit farthest from the adapter plate 34. In this headrest position, the first and second connecting links 50, 52 are rotated fully outward. Mechanical stops 54 may be used to limit rotation of the first and second connecting links 50, 52 to limit headrest travel forward, prevent overtravel and/or prevent unwanted lateral shifting when the headrest 32 is deployed. In the fully forward position the first and second carriages 46, 48 are at their outward lateral limits. Mechanical stops may also be used to limit outward travel of the first and second carriages 46, 48 to limit forward travel of the headrest 32. The lateral parts 38 are shown in the same plane with the center part 36, but can be selectively independently angled forward or back.

Figure 9:
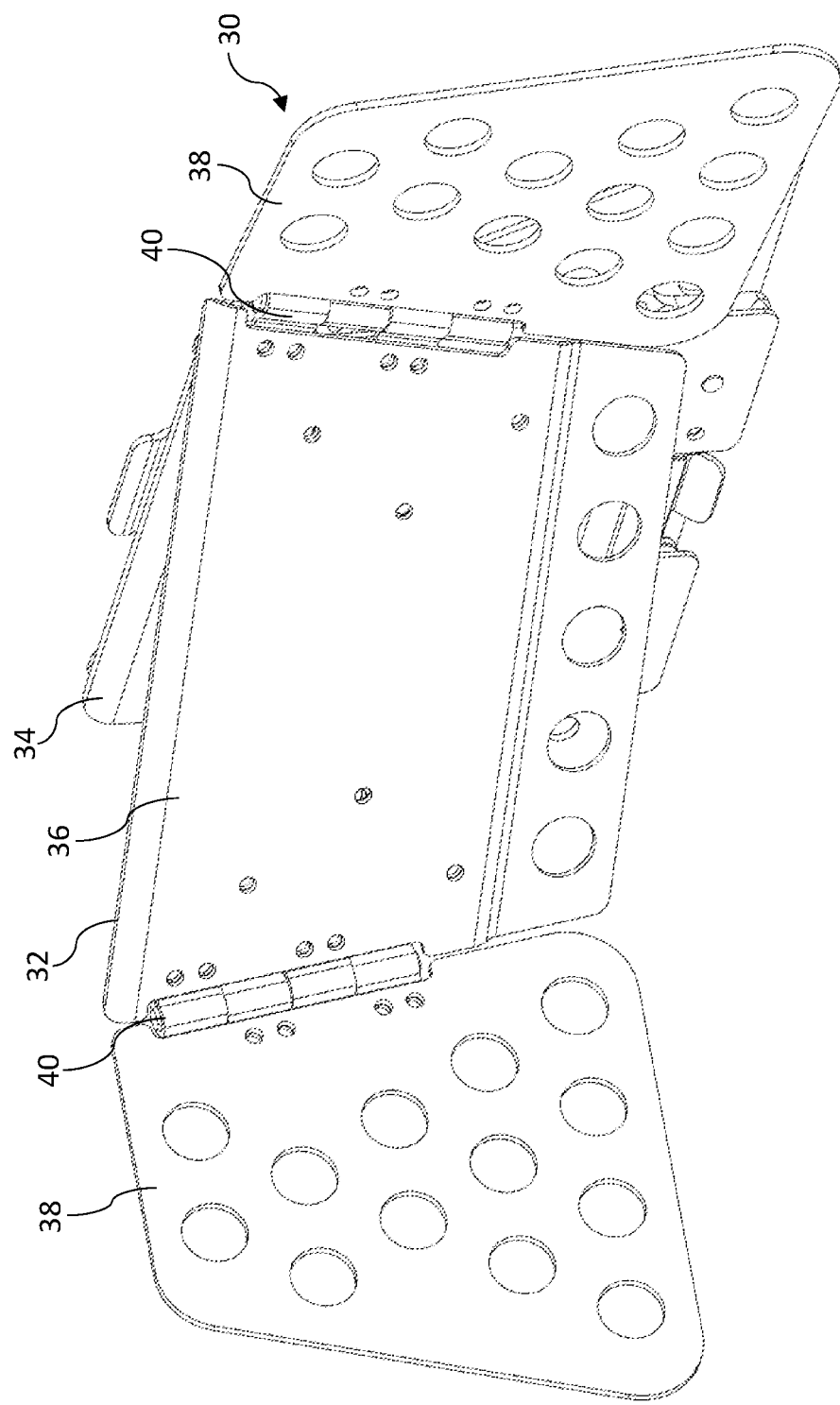
FIG. 9 is an isometric view of the headrest assembly showing the headrest translated laterally to be positioned at an angle.
Figure 10:
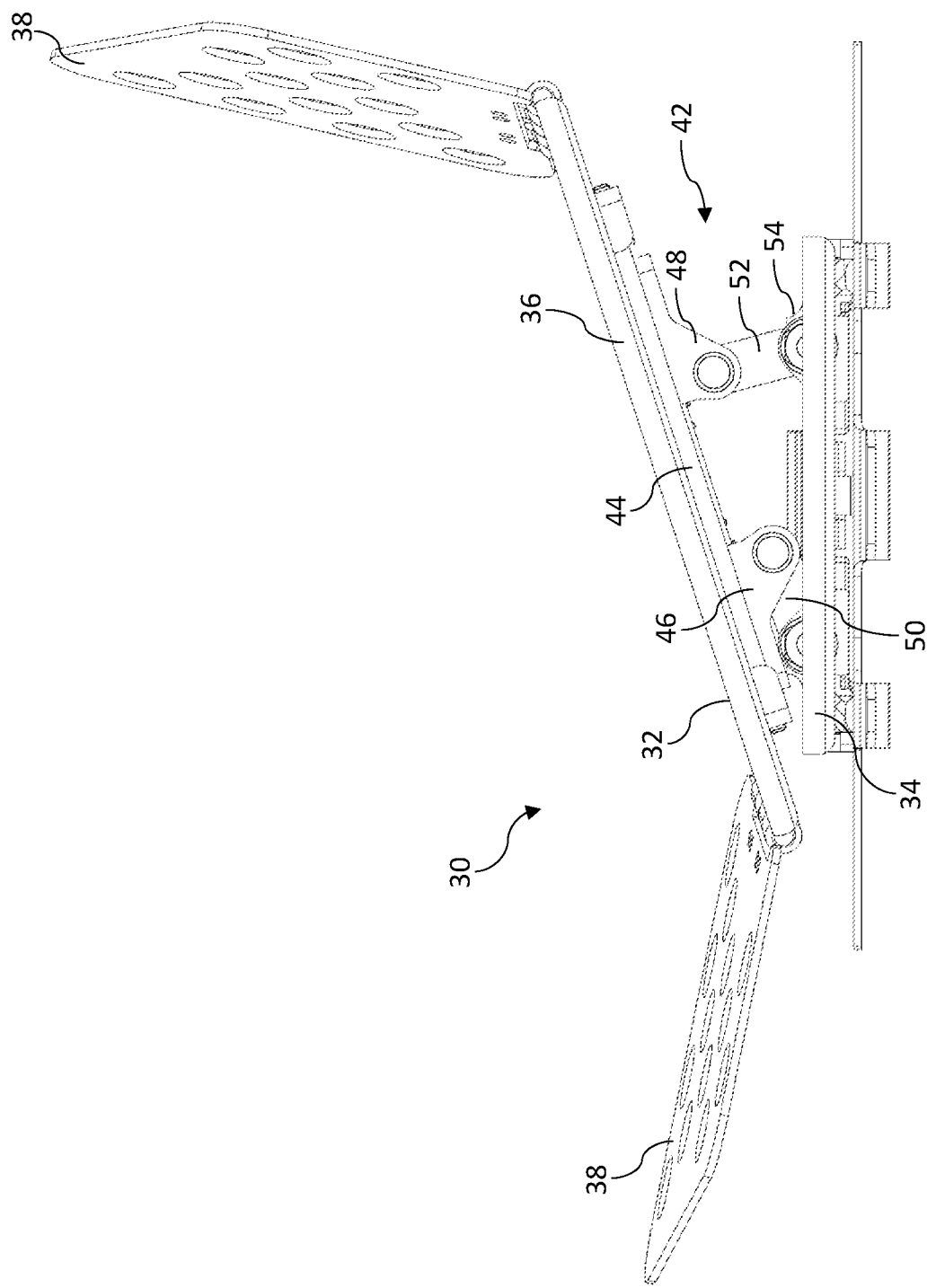
FIG. 10 is a top view of the headrest assembly shown in FIG. 9.

FIGS. 9 and 10 show the headrest assembly 30 rotated to provide lateral support to one side of the head. While the headrest 32 is shown fully rotated to the left, the headrest could be rotated fully to the right or partially rotated to either side. In addition to the headrest rotation, the lateral parts 38 are shown angled forward to provide additional lateral support with the left lateral part angled forward to clear the seat back to allow the headrest to rotate fully. In the rotated headrest position shown, the linkage including the first carriage 46 and the first connecting link 50 is nearly stowed or collapsed against the seat back, and the linkage including the second carriage 48 and the second connecting link 52 is fully extended to position the headrest at the maximum angle.

Figure 11:
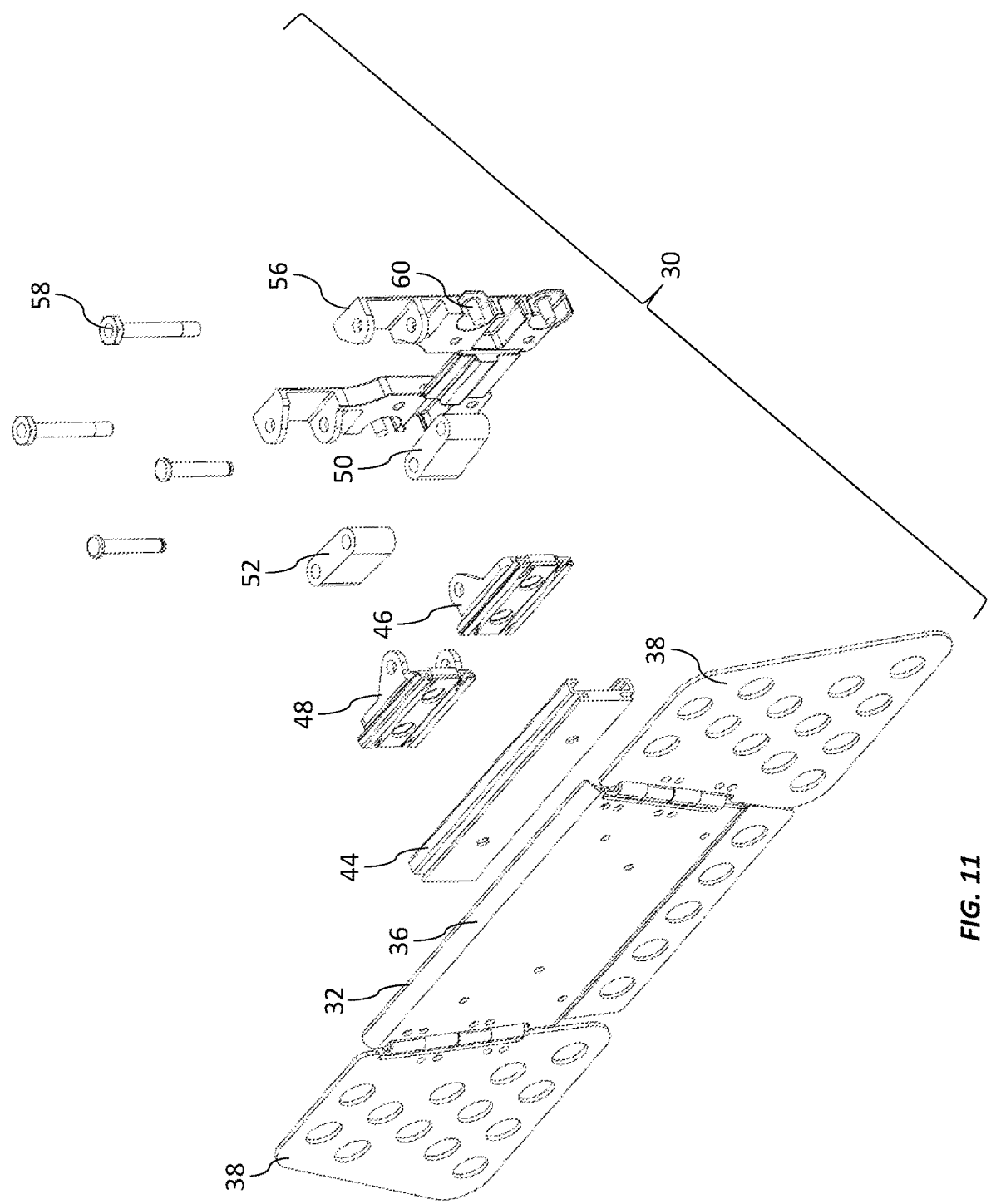
FIG. 11 is an exploded view of the headrest assembly viewed from the front.
Figure 12:
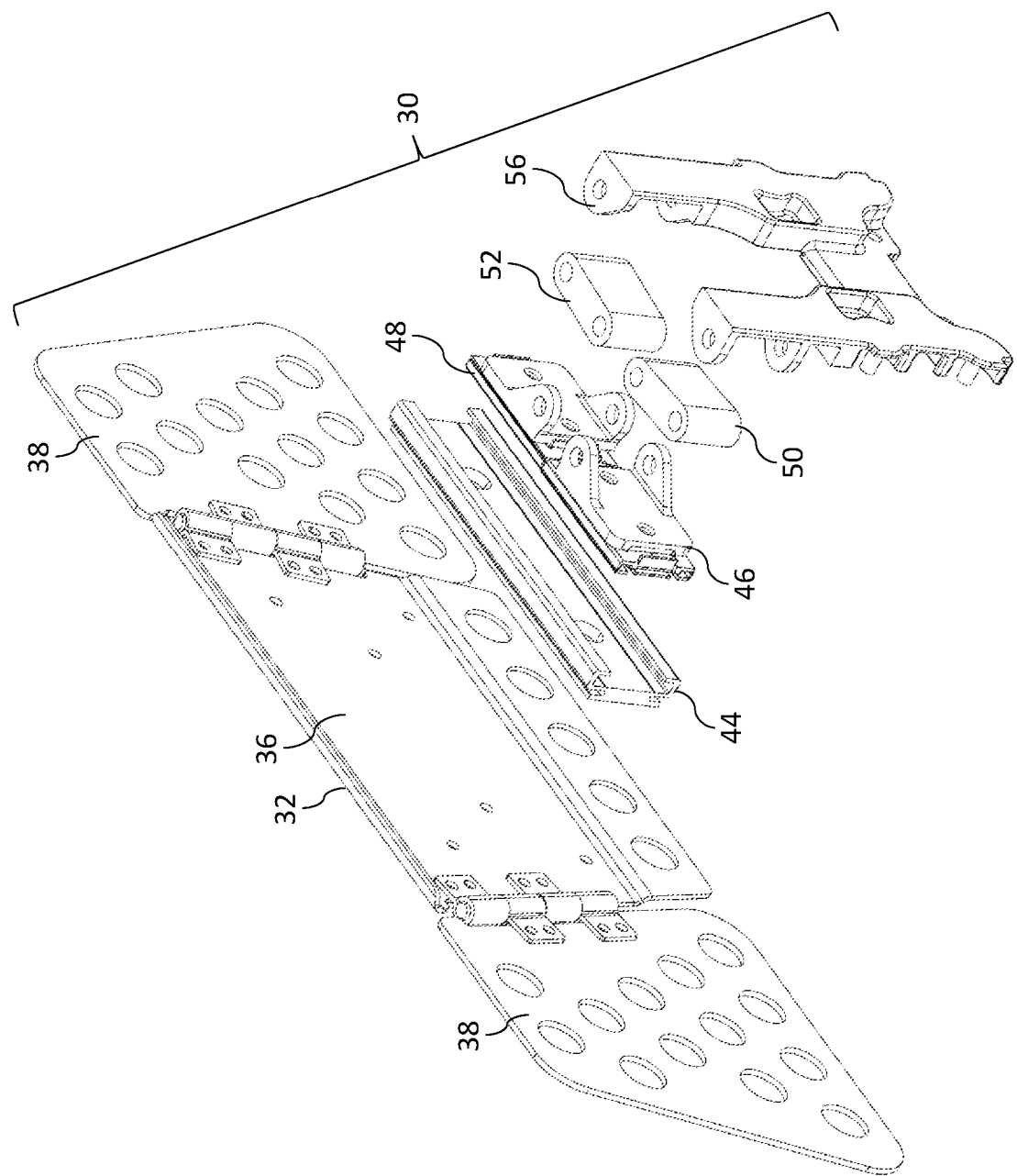
FIG. 12 is an exploded view of the headrest assembly viewed from the back.

FIGS. 11 and 12 show the general headrest assembly 30 parts. The adjustment mechanism, and particularly the first and second connecting links 50, 52, may be pivotally attached to a guide 56 attachable to the adapter plate or other seat back element. Pins 58 may be used to retain the ends of the first and second connecting links 50, 52 to their respective attachment points on the first and second carriages 46, 48 and on the guide 56. In some embodiments, the guide 56 may be part of an optional vertical adjustment mechanism for moving the headrest assembly up or down relative to the seat back. The vertical adjustment mechanism may movably couple the headrest assembly 30 to the seat back.

The vertical adjustment mechanism may include spaced elongate guide rails affixed to a seat back plate. The guide 56 may be disposed between the spaced guide rails to be guided for linear movement up or down relative to the guide rails. The guide 56 may include posts 60 on which vertically-oriented rollers may be mounted. The plurality of rollers may be engaged to roll along facing surfaces of the spaced guide rails to facilitate smooth vertical movement of the assembly. In some embodiments, the vertical adjustment mechanism may further include friction members carried on the guide. The friction members may have a flat face that contacts the flat facing surfaces on the guide rails to enhance friction between the two surfaces to maintain the relative position of the head rest assembly. Thus, while the rollers facilitate smooth movement of the headrest assembly up and down, the friction members help maintain the headrest in a selected position. The friction members may each be spring-biased in a direction of their respective guide rail. In some embodiments, covers may attach to the guide 56 to maintain the rollers on their respective posts and friction members in their respective recesses.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An adjustable headrest assembly for attachment to a seat back, comprising:
   an adapter plate assembly attachable to a seat back element;
   a headrest disposed forward of the adapter plate assembly; and
   an adjustment mechanism movably coupling the headrest to the adapter plate assembly, the adjustment mechanism including:
   i. a linear slide mounted to the headrest;
   ii. first and second carriages independently slidable along the linear slide; and
   iii. first and second connecting links coupling the respective first and second carriages to the adapter plate assembly, the first connecting link pivotally attached to the first carriage and to the adapter plate assembly, and the second connecting link pivotally attached to the second carriage and to the adapter plate assembly;

wherein the first carriage and the first connecting link together form a first linkage, the second carriage and the second connecting link together form a second linkage, the first and second linkages move together to translate the headrest relative to the adapter plate assembly, and the first and second linkages move independently to rotate the headrest relative to the adapter plate assembly.

2. The adjustable headrest assembly of claim 1, wherein the adjustment mechanism provides each of forward translation, lateral translation, and rotational adjustment of the headrest relative to the adapter plate assembly.

3. The adjustable headrest assembly of claim 1, wherein the first connecting link is pivotally attached at one end to the first carriage and at an opposing end to the adapter plate assembly such that the first connecting link can rotate between a first position parallel to the adapter plate assembly and a second position at an angle to the adapter plate assembly, and wherein the second connecting link is pivotally attached at one end to the second carriage and at an opposing end to the adapter plate assembly such that the second connecting link can rotate between a first position parallel to the adapter plate assembly and a second position at an angle to the adapter plate assembly.

4. The adjustable headrest assembly of claim 1, wherein the first and second connecting links rotate outward in opposite directions to drive the headrest apart from the adapter plate assembly and rotate inward in opposite directions to drive the headrest toward the adapter plate assembly.

5. The adjustable headrest assembly of claim 1, wherein the adjustment mechanism allows one side of the headrest to move away from the adapter plate assembly while an opposing side of the headrest may remain generally with the adapter plate assembly.

6. The adjustable headrest assembly of claim 1, wherein the headrest includes a center part and lateral parts pivotally attached to the center part and independently adjustable in angle relative to the center part.

7. The adjustable headrest assembly of claim 6, wherein the lateral parts are adjustable in angle relative to the center part independent of adjustment of the center part relative to the adapter plate assembly.

8. The adjustable headrest assembly of claim 1, wherein the adapter plate assembly includes an adapter plate and a guide mounted to the adapter plate, wherein each of the first and second connecting links are pivotally attached to the guide.

9. The adjustable headrest assembly of claim 8, wherein the guide is a component of a vertical adjustment mechanism movably coupling the adapter plate assembly to a seat back element.

10. An adjustable headrest assembly attachable to a seat back, comprising:
a headrest; and
an adjustment mechanism including:
  i. a linear slide mounted to a back of the headrest;
  ii. first and second carriages independently slidable along the linear slide; and
  iii. first and second connecting links, the first connecting link pivotally attached to the first carriage and pivotally attachable to a seat back element, and the second connecting link pivotally attached to the second carriage and pivotally attachable to a seat back element;

wherein headrest translation is achievable by rotating the first and second connecting links an equal amount in opposite directions and sliding the first and second carriages an equal amount along the linear slide, and wherein headrest rotation is achievable by rotating the first and second connecting links an unequal amount in opposite directions and sliding the first and second carriages an unequal amount along the linear slide.

11. The adjustable headrest assembly of claim 10, wherein the adjustment mechanism provides each of forward translation, lateral translation, and rotational adjustment of the headrest.

12. The adjustable headrest assembly of claim 10, further comprising an adapter plate assembly attachable to the seat back, wherein the first connecting link is pivotally attached at one end to the first carriage and at an opposing end to the adapter plate assembly, and wherein the second connecting link is pivotally attached at one end to the second carriage and at an opposing end to the adapter plate assembly.

13. The adjustable headrest assembly of claim 10, wherein the first and second connecting links rotate outward in opposite directions to drive the headrest forward and rotate inward in opposite directions to drive the headrest rearward.

14. The adjustable headrest assembly of claim 10, wherein the adjustment mechanism allows one side of the headrest to move away from the seat back while an opposing side of the headrest may remain with the seat back.

15. The adjustable headrest assembly of claim 10, wherein the headrest comprises a center part and lateral parts pivotally attached to the center part and adjustable in angle relative to the center part, and wherein the lateral parts are adjustable in angle relative to the center part independent of adjustment of the center part relative to the seat back.

16. An aircraft passenger seat assembly, comprising:
a seat back; and
an adjustable headrest assembly attached to the seat back, the adjustable headrest assembly including:
  i. an adapter plate;
  ii. a headrest disposed forward of the adapter plate; and
  i. an adjustment mechanism movably coupling the headrest to the adapter plate and including a linear slide mounted to a back of the headrest, first and second carriages independently slidable along the linear slide, and first and second connecting links, the first connecting link being pivotally attached to the first carriage and to the adapter plate and the second connecting link being pivotally attached to the second carriage and to the adapter plate such that the first carriage and the first connecting link together form a first linkage, the second carriage and the second connecting link together form a second linkage, the first and second linkages move together to translate the headrest relative to the adapter plate assembly, and the first and second linkages move independently to rotate the headrest relative to the adapter plate assembly.

17. The aircraft passenger seat assembly of claim 16, wherein the adjustment mechanism provides each of forward translation, lateral translation, and rotational adjustment of the headrest relative to the seat back.

18. The aircraft passenger seat assembly of claim 16, wherein the first and second connecting links rotate outward in opposite directions to drive the headrest apart from the adapter plate and rotate inward in opposite directions to drive the headrest toward the adapter plate.

19. The aircraft passenger seat assembly of claim 16, wherein the headrest includes a center part and lateral parts pivotally attached to the center part and adjustable in angle relative to the center part, and wherein the lateral parts are adjustable in angle relative to the center part independent of adjustment of the center part relative to the adapter plate.

20. The aircraft passenger seat assembly of claim 16, further comprising a guide mounted to the adapter plate, wherein the first and second connecting links are pivotally attached to the guide, and wherein the guide is a component of a vertical adjustment mechanism for moving the adjustable headrest assembly up or down relative to the seat back.

* * * * *